United States Patent
Song et al.

(10) Patent No.: US 10,032,392 B2
(45) Date of Patent: Jul. 24, 2018

(54) BACKLIGHT UNIT AND DISPLAY DEVICE HAVING THE SAME

(71) Applicant: Samsung Display Co., Ltd., Yongin, Gyeonggi-do (KR)

(72) Inventors: Daehoon Song, Seoul (KR); Young-keun Lee, Cheonan-si (KR); Juhwa Ha, Asan-si (KR); Jin Seo, Osan-si (KR); Juyoun Son, Hwaseong-si (KR); Sangheon Ye, Cheonan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 227 days.

(21) Appl. No.: 13/861,038

(22) Filed: Apr. 11, 2013

(65) Prior Publication Data

US 2014/0146522 A1    May 29, 2014

(30) Foreign Application Priority Data

Nov. 23, 2012   (KR) .................... 10-2012-0133730

(51) Int. Cl.
*G09F 13/04*     (2006.01)
*G09F 13/08*     (2006.01)
(Continued)

(52) U.S. Cl.
CPC .... *G09F 13/0409* (2013.01); *G02F 1/133603* (2013.01); *G02F 1/133605* (2013.01); *G09F 13/04* (2013.01)

(58) Field of Classification Search
CPC ............. G02F 1/133603; G02F 1/00; G02F 2001/133613; G02F 1/133611;
(Continued)

(56) References Cited

U.S. PATENT DOCUMENTS 7,894,017 B2    2/2011  Han et al.
7,940,350 B2    5/2011  Jeong
(Continued)

FOREIGN PATENT DOCUMENTS

CN    101646974     2/2010
CN    101939583     1/2011
(Continued)

*Primary Examiner* — Erin Kryukova
(74) *Attorney, Agent, or Firm* — F. Chau & Associates, LLC

(57) ABSTRACT

A backlight unit includes a light source part configured to emit a light and a reflective sheet disposed under the light source part. The light source part includes a first light source block including a plurality of light sources with first distances therebetween and a second light source block including a plurality of light sources with second distances therebetween. The first distances increase or decrease as the light sources of the first light source block are closer to an end portion of the first light source block than to a center portion of the first light source block, and the second distances increase as the light sources of the second light source block axe closer to an end portion of the second light source block than to a center portion of the second light source block.

18 Claims, 6 Drawing Sheets

(51) Int. Cl.
*F21S 4/00* (2016.01)
*F21V 21/00* (2006.01)
*G02F 1/1335* (2006.01)

(58) Field of Classification Search
CPC ............ G02F 1/133605; G02B 6/0068; G02B 6/0091; G09F 13/0409; G09F 13/04
USPC ... 362/97.1, 97.2, 97.3, 97.4, 612, 623, 625, 362/632, 249.02, 249.06
See application file for complete search history.

(56) References Cited

U.S. PATENT DOCUMENTS

| | | | |
|---|---|---|---|
| 7,946,724 B2 | 5/2011 | Shin et al. | |
| 2006/0087827 A1* | 4/2006 | Jung et al. | 362/29 |
| 2006/0087866 A1* | 4/2006 | Ng et al. | 362/612 |
| 2006/0245204 A1 | 11/2006 | Mizuta | |
| 2006/0279671 A1* | 12/2006 | Han et al. | 349/61 |
| 2006/0290620 A1* | 12/2006 | Chou et al. | 345/82 |
| 2008/0068861 A1* | 3/2008 | Lin et al. | 362/613 |
| 2008/0088570 A1* | 4/2008 | Chang | 345/102 |
| 2008/0303040 A1* | 12/2008 | Chou | H01L 33/60 257/89 |
| 2008/0316750 A1* | 12/2008 | Park | 362/294 |
| 2009/0168401 A1* | 7/2009 | Kwon et al. | 362/97.1 |
| 2010/0027241 A1* | 2/2010 | Nakanishi | 362/97.1 |
| 2010/0060820 A1 | 3/2010 | Kleppinger et al. | |
| 2011/0058118 A1* | 3/2011 | Kim | 349/61 |
| 2011/0280002 A1 | 11/2011 | Furukawa | |
| 2012/0044438 A1* | 2/2012 | Cao et al. | 349/61 |
| 2012/0057097 A1* | 3/2012 | Shimizu | 349/61 |
| 2012/0081632 A1* | 4/2012 | Yokota | 349/61 |
| 2012/0139445 A1* | 6/2012 | Fujiwara et al. | 315/294 |
| 2012/0218475 A1* | 8/2012 | Matsumoto | 348/725 |

FOREIGN PATENT DOCUMENTS

| | | |
|---|---|---|
| JP | 2007-109692 | 4/2007 |
| JP | 2008-097896 | 4/2008 |
| JP | 2008-103200 | 5/2008 |
| JP | 2009-048791 | 3/2009 |
| JP | 2010-015853 | 1/2010 |
| KR | 1020030001847 | 1/2003 |
| KR | 1020050063583 | 6/2005 |
| KR | 1020100098463 | 9/2010 |
| WO | 2010146914 | 12/2010 |
| WO | 2011024498 | 3/2011 |

* cited by examiner

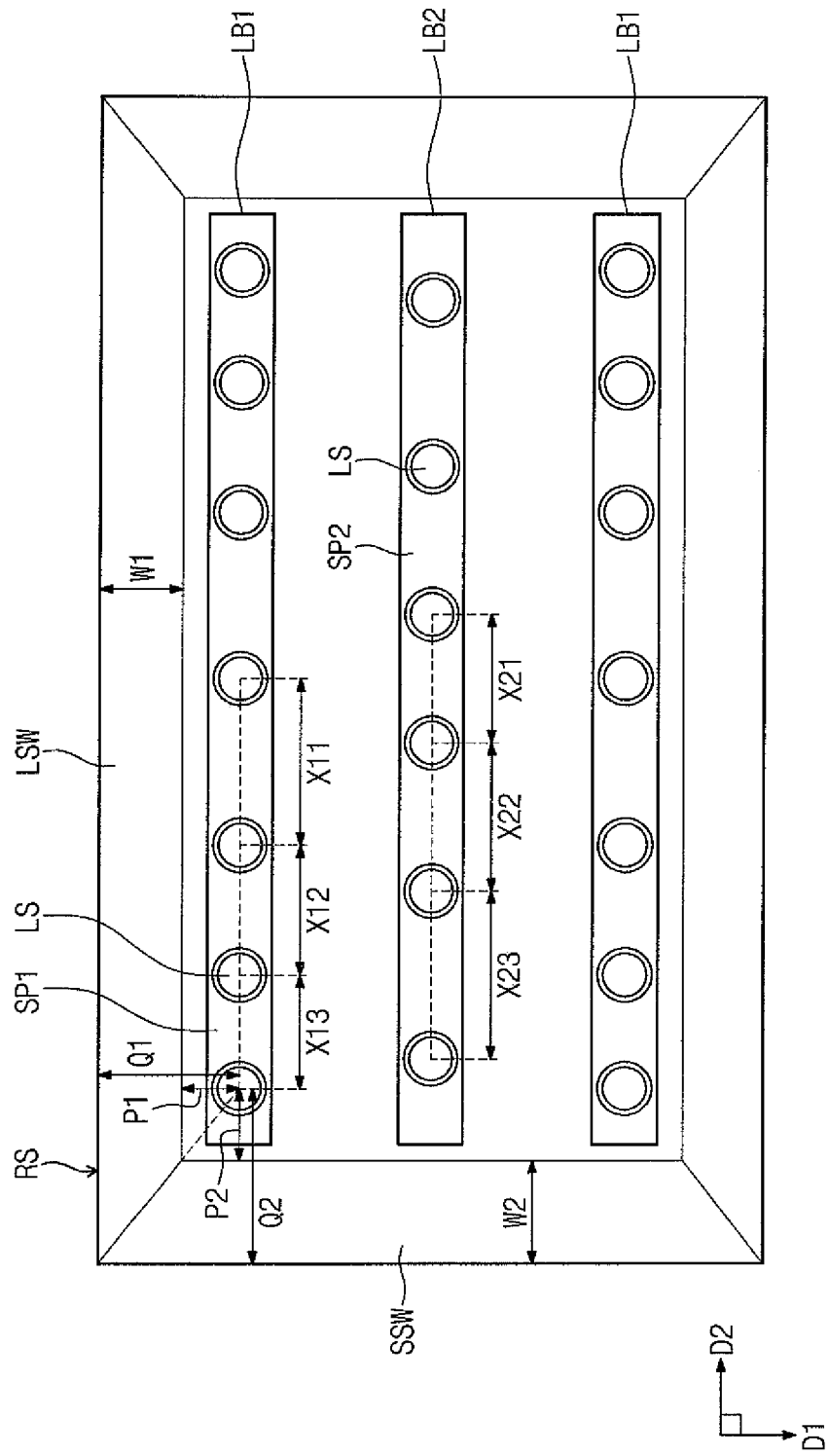

BACKLIGHT UNIT AND DISPLAY DEVICE HAVING THE SAME

CROSS-REFERENCE TO RELATED APPLICATION

This application claims priority to Korean Patent Application No. 10-2012-0133730, filed on Nov. 23, 2012, the disclosure of which is hereby incorporated by reference herein in its entirety.

1. TECHNICAL FIELD

The present disclosure relates to a backlight unit and a display device having the same. More particularly, the present disclosure relates to a backlight unit capable of increasing a display quality and a display device having the backlight unit.

2. DISCUSSION OF THE RELATED ART

A liquid crystal display includes a display panel to display an image, but the display panel is not self-emissive. Accordingly, the display device may require a backlight unit to provide the display panel with light.

The backlight unit may be classified into, for example, an edge-illumination type backlight unit and a direct-illumination type backlight unit according to the position of a light source thereof. In the direct-illumination type backlight unit, the light source is located at the rear position of the display panel, and in the edge-illumination type backlight unit, the light source is located at a side portion of a rear of the display panel.

In general, the light source includes, for example, a line light source or a point light source. As a result, light emitted from the light source and supplied to the display panel may be non-uniform.

SUMMARY

Exemplary embodiments of the present invention provide a backlight unit capable of uniformly providing light to a display panel.

Exemplary embodiments of the present invention provide a display device having the above backlight unit.

Exemplary embodiments of the present provide a display device including a display panel that includes a display area and a plurality of light source blocks disposed under the display area in a first direction.

The light source blocks includes a first light source block that includes a plurality of light sources disposed in a second direction vertical to the first direction with first distances between the plurality of light sources of the first light source block and a second light source block that includes a plurality of light sources disposed in the second direction with second distances disposed between the plurality of light sources of the second light source block. The first distances increase or decrease as the light sources of the first light source block are closer to an end portion of the first light source block than a center portion of the first light source block, and the second distances increase as the light sources of the second light source block are closer to an end portion of the second light source block than to a center portion of the second light source block.

At least one of the first and second light source blocks is provided in a plural number, and the first light source block is alternately arranged with the second light source block in the first direction.

The number of the first light source blocks is more than the number of the second light source blocks by one, and the first light source blocks are disposed at odd-numbered rows.

Distances between the first light source block and the second light source block adjacent to the first light source block are different from each other.

The display device further includes a reflective sheet disposed under the first and second light source blocks.

The reflective sheet includes a bottom portion substantially parallel to a surface of the display panel and a side portion bent upward from the bottom portion. The display area has a rectangular shape with a pair of long sides and a pair of short sides, the side portion includes a long side surface portion corresponding to the long sides of the display area and a short side surface portion corresponding to the short sides of the display area, and an inclination angle of the long side surface portion is different from an inclination angle of the short side surface portion.

The inclination angle of the long side surface portion is in a range from about 27° to about 32° and the inclination angle of the short side surface portion is in a range from about 30° to about 36°.

The light source of the first light source block most adjacent to a vertex of the display area among the light sources is disposed on an imaginary line extended from a line at which the long side surface portion meets the short side surface portion when viewed in a plan view.

The light sources of the first and second light source blocks are configured to be individually and independently driven.

Exemplary embodiments of the present invention provide a backlight unit including a light source part configured to emit a light and a reflective sheet disposed under the light source part.

The light source part includes a first light source block that includes a plurality of light sources disposed in a predetermined direction with first distances between the plurality of lights sources of the first light source block and a second light source block that includes a plurality of light sources disposed in the predetermined direction with second-distances between the plurality of light sources of the second light source block. The first distances increase or decrease as the light sources of the first light source block are closer to an end portion of the first light source block than to a center portion of the first light source block, and the second distances increase as the light sources of the second light source block are closer to an end portion of the second light source block than to a center portion of the second light source block.

In accordance with an exemplary embodiment of the present invention, a display device is provided. The display device includes a display panel including a display area and a non-display area surrounding the display area, and the display panel has a first pair of sides and a second pair of sides connected to the first pair of sides, wherein the first pair of sides is longer than the second pair of sides. A top chassis is disposed on the display panel covering the non-display area of the display panel and includes a display window therethrough which exposes the display area of the display panel.

The display device further includes a backlight unit disposed under the display panel, and the backlight includes a mold frame disposed along an edge of the display panel and configured to support the display panel, an optical sheet disposed under the mold frame, a light source part including a plurality of light sources disposed under the optical sheet and configured to emit light, a reflective sheet including a bottom portion having a plate shape parallel to a lower surface of the display panel and smaller in size than the display area and a side portion bent upward from an extension surface of the bottom portion at an inclination angle of greater than about 0 degrees and less than about 90 degrees and a bottom chassis configured to accommodate the display panel, the mold frame, the light source part, the optical sheet and the reflective sheet.

The light source part includes a first light source block disposed in a first direction and including a plurality of light sources disposed in a second direction vertical to the first direction with first distances between the plurality of light sources of the first light source block and a second light source block disposed in the first direction and including a plurality of light sources disposed in the second direction with second distances between the plurality of light sources of the second light source block. At least one of the first and second light source blocks is disposed in a plural number and the first light source block is alternately disposed with the second light source block in the first direction and the first light source block includes an even number of the light sources and the second source block includes an odd number of the lights sources in a lesser amount than the light sources included with the first light source block. In addition, the first distances increase or decrease as the light sources of the first light source block are closer to an end portion of the first light source block than to a center portion of the first light source block, and the second distances increase as the light sources of the second light source block are closer to an end portion of the second light source block than to a center portion of the second light source block.

According to the above, the display device according to exemplary embodiments of the present invention may increase the uniformity of the light traveling to the display panel from the light sources. Thus, a display quality of the display device may be increased.

BRIEF DESCRIPTION OF THE DRAWINGS

Exemplary embodiments of the present invention can be understood in more detail from the following detailed description when considered in conjunction with the accompanying drawings in which:

FIG. 3 is a plan view showing a light source part and a reflective sheet of the display device shown in FIG. 1;

DETAILED DESCRIPTION OF EXEMPLARY EMBODIMENTS

It will be understood that when an element or layer is referred to as being "on", "connected to" or "coupled to" another element or layer, it can be directly on, connected or coupled to the other element or layer or intervening elements or layers may be present. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms, "a", "an" and "the" are intended to include the plural forms as well, unless the context clearly indicates otherwise.

Hereinafter, exemplary embodiments of the present invention will be explained in detail with reference to the accompanying drawings.

Figure 1:
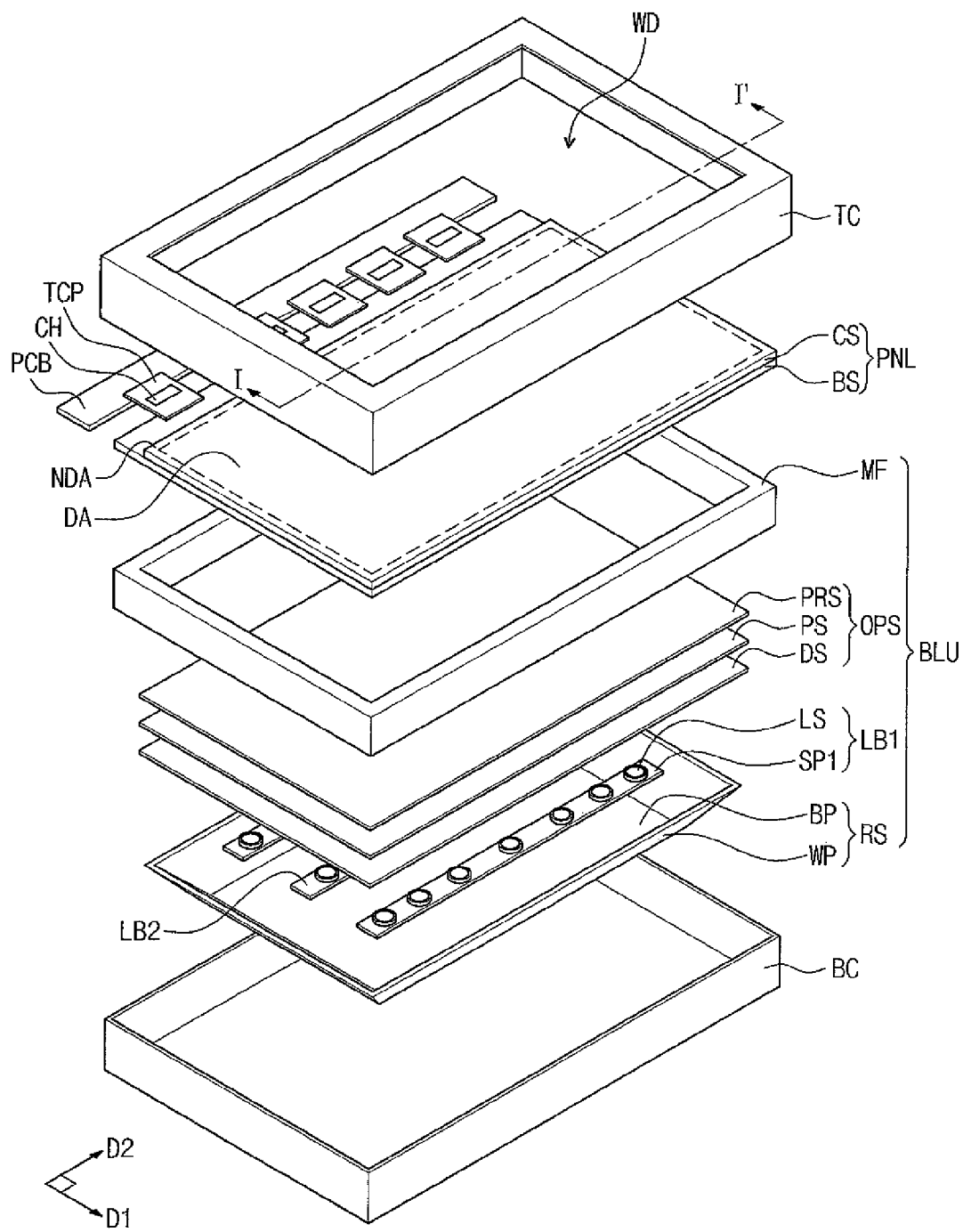
FIG. 1 is an exploded perspective view showing a display device according to an exemplary embodiment of the present invention.
Figure 2:
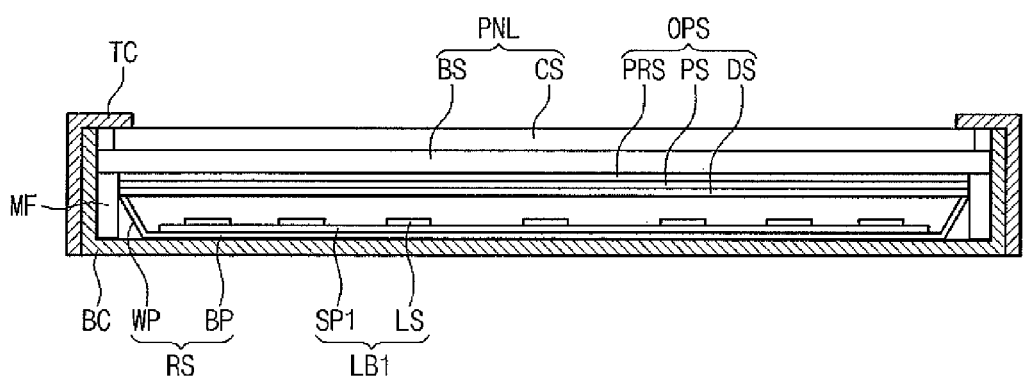
FIG. 2 is a cross-sectional view taken along a line I-I' of FIG. 1.

FIG. 1 is an exploded perspective view showing a display device according to an exemplary embodiment of the present invention and FIG. 2 is a cross-sectional view taken along a line I-I' of FIG. 1.

Referring to FIGS. 1 and 2, the display device includes, for example, a display panel PNL, a backlight unit BLU, and a top chassis TC. For the convenience of explanation, a direction in which an image is displayed in the display device will be described as an upper direction and a direction opposite to the upper direction will be described as a lower direction, but they should not be limited thereto or thereby.

The display panel PNL displays the image. The display panel PNL is a light receiving (non-self-emitting) display panel. Accordingly, the display panel PNL may be, but is not limited to, a liquid crystal display panel, an electrowetting display panel, an electrophoretic display panel, or a microelectromechanical system display panel. In the present exemplary embodiment, a liquid crystal display panel will be described as the display panel PNL.

The display panel PNL may have, for example, a rectangular plate shape with two pairs of sides meeting at right angles, and one of the two pairs of sides is longer than the other. For example, the display panel PNL has the rectangular plate shape with a pair of long sides and a pair of short sides. The display panel PNL includes, for example, a base substrate BS, an opposite substrate CS opposite to the base substrate BS, and a liquid crystal layer (not shown) disposed between the base substrate BS and the opposite substrate CS. When viewed in a plan view, the display panel PNL includes a display area DA in which an image is displayed and a non-display area NDA, in which the image is not displayed, surrounding the display area DA. The non-display area NDA is covered by, for example, the top chassis TC.

The base substrate BS includes, for example, a plurality of pixel electrodes (not shown) and a plurality of thin film transistors (not shown) electrically connected to the pixel electrodes in a one-to-one correspondence. Each thin film transistor switches a driving signal applied to a corresponding pixel electrode of the pixel electrodes. In addition, the opposite substrate CS includes a common electrode (not shown) that forms an electric field in cooperation with the pixel electrodes to control an arrangement of liquid crystal molecules of the liquid crystal layer. The display panel PNL operates the liquid crystal molecules of the liquid crystal layer to display the image in a front direction of the display panel PNL. The base substrate BS and the opposite substrate CS may be an insulation substrate made of, for example, transparent glass, quartz or plastic. Further, in an exemplary embodiment, the glass may include, for example, tempered glass. In an exemplary embodiment, the base substrate BS and the opposite substrate CS may be formed of, for example, one of polycarbonate (PC), polyester (PET), polypropylene (PP), polyethylene (PE) and polymethyl methacrylate (PMMA).

The display panel PNL may be provided with, for example, a driving chip CH that applies the driving signal, a tape carrier package TCP mounted with the driving chip CH thereon, and a printed circuit board PCB electrically connected to the display panel PNL through the tape carrier package TCP. In FIG. 1, the printed circuit board PCB is disposed on the same plane as the display panel PNL, but exemplary embodiments of the present invention are not limited thereto or thereby. That is, in an exemplary embodiment, the printed circuit board PCB may alternatively be disposed, for example, on an outer surface of a bottom chassis CS. In this case, the tape carrier package TCP is bent along the outer surface of the bottom chassis BC to connect the display panel PNL and the printed circuit board PCB. In an exemplary embodiment, the driving chip CH generates the driving signal to drive the display panel PNL in response to an external signal. The external signal is provided from the printed circuit board PCB and includes various signals, e.g., an image signal, various control signals, a driving voltage, etc.

The backlight unit BLU is disposed under the display panel PNL to provide light to the display panel PNL. The backlight unit BLU includes, for example, a mold frame MF to support the display panel PNL, a light source part including a plurality of light sources to emit the light, an optical sheet OPS to increase the efficiency of the light, a reflective sheet to change a direction in which the light travels, and the bottom chassis BC to accommodate the display panel PNL, the mold frame MF, the light source part, the optical sheet OPS, and the reflective sheet.

The mold frame MF is provided, for example, along an edge of the display panel PNL under the display panel PNL to support the display panel PNL. The mold frame MF may include, for example, a fixing member, e.g., a catching jaw, so as to fix or support the light source part, and the optical sheet OPS except for the display panel PNL. The mold frame MF is provided to correspond to, for example, four sides of the display panel PNL or a portion of the four sides of the display panel PNL. For example, the mold frame MF has a rectangular ring shape corresponding to the four sides of the display panel PNL or a U shape corresponding to three sides of the display panel PNL. The mold frame MF may be, for example, integrally formed as a single unitary and individual unit or formed by assembling plural parts. The mold frame MF may be formed of, for example, an organic material, e.g., a polymer resin, but the mold frame MF should not be limited to the organic material. For example, in an exemplary embodiment, the mold frame MF may be formed of plastic materials including but not limited to polycarbonate (PC) or a mixture of polycarbonate (PC) and acrylonitrile butadiene styrene copolymer (ABS).

The light source part provides the light to the display panel. The light source part includes, for example, light source blocks LB1 and LB2 and a light source part control unit that controls the light source blocks LB1 and LB2. Each light source block LB1 and LB2 includes, for example, a plurality of light sources LS and supporters SP1 and SP2 supporting the light sources LS. Each supporter SP1 and SP2 may be, but is not limited to, a printed circuit board printed with wirings applying a source voltage to the light sources LS and controlling the light sources LS.

Each light source LS may be, but is not limited to, a point light source, a line light source, or a surface light source. For example, the point light source may include, a light emitting diode, and the line light source may include a cold cathode fluorescent lamp, a hot cathode fluorescent lamp, or an external electrode florescent lamp.

As an example, the point light source, e.g., a light emitting diode, will be described as the light source in the present exemplary embodiment. The light emitting diode is provided in, for example, a plural number and the light emitting diodes are arranged in a line on each of the supporters SP1 and SP2. Here, the light source means, for example, a minimum light emitting unit, which is able to individually control an amount of the light emitted therefrom. Thus, one light source is configured to include, for example, one light emitting diode or plural light emitting diodes of which the brightness of the light emitting diodes is substantially simultaneously controlled. In the present exemplary embodiment, the light source blocks LB1 and LB2 include, for example, the supporters SP1 and SP2 and the light sources LS, but exemplary embodiments of the present invention are not limited thereto or thereby. That is, alternatively, in an exemplary embodiment, the supporters SP1 and SP2 may be omitted. In this case, a separate supporter member supporting the light sources and/or a separate wiring applying the source voltage to the light sources may be prepared.

The light source control unit is connected to the light sources LS. The light source control unit analyzes the image displayed on the display panel PNL to output a local dimming signal and individually controls the light sources LS in response to the local dimming signal. Although not shown in figures, the light source control unit may be mounted on a separate printed circuit board, or on the supporters SP1 and SP2.

The optical sheet OPS is disposed between the light source blocks LB1 and LB2 and the display panel PNL to control the light emitted from the light sources LS. The optical sheet OPS includes, for example, a diffusion sheet DS, a prism sheet PS, and a protective sheet PRS.

The diffusion sheet DS diffuses the light. The prism sheet PS condenses the light diffused by the diffusion sheet DS to allow the light exiting from the diffusion sheet DS to travel in a direction, for example, substantially vertical to the display panel PNL. The light exiting from the prism sheet PS is, for example, vertically incident into the display panel PNL. The protective sheet PRS is disposed on the prism sheet PS to protect the prism sheet PS from external impacts. In the present exemplary embodiment, the optical sheet OPS is configured to include one diffusion sheet DS, one prism sheet PS, and one protective sheet PRS, but exemplary embodiments of the present invention are not limited thereto or thereby. That is, alternatively, in an exemplary embodiment, at least one of the diffusion sheet, the prism sheet PS, and the protective sheet PRS of the optical sheet OPS may be provided, for example, in plural number, or one or more of the diffusion sheet DS, the prism sheet PS, and the protective sheet PRS may be omitted from the optical sheet DS. In addition, the stack order of the diffusion sheet DS, the prism sheet PS, and the protective sheet PRS may be changed.

The reflective sheet RS is disposed under the light source part to reflect the light leaked from the light guide part to thereby allow the light leaked from the light guide part to travel to the display panel PNL. The reflective sheet RS is disposed, for example, on the bottom chassis BC to reflect the light. As a result, the amount of the light traveling to the display panel PNL is enhanced by the reflective sheet RS. The reflective sheet RS may be formed of, for example, a reflective material, such as polyethylene terephthalate (PET) or aluminum. Alternatively, the reflective sheet RS may include other materials such as, for example, polybutylene terephthalate (PBT) or a resin such as polycarbonate (PC) blended in polyethylene terephthalate (PET) or polybutylene terephthalate (PBT).

The reflective sheet RS includes, for example, a bottom portion BP and a side portion WP connected to the bottom portion BP and bent upward from the bottom portion BP.

The bottom portion BP has, for example, a plate shape parallel to a lower surface of the display panel PNL and a size smaller than the display area DA of the display panel PNL. For example, the bottom portion BP has a rectangular shape with long sides corresponding to the long sides of the display area DA and short sides corresponding to the short sides of the display area DA. Accordingly, the bottom portion BP is disposed, for example, inside the display area DA when viewed in a plan view.

The side portion WP is, for example, bent upward from the bottom portion BR When viewed in a plan view, the side portion WP is provided, for example, along an end portion of the bottom portion BP in the display area DA of the display panel PNL. The side portion WP is, for example, inclined at a predetermined angle with respect to an extension surface of the bottom portion BP. In this case, the angle (hereinafter, referred to as an inclination angle) between the side portion WP and the extension surface of the bottom portion BP is, for example, larger than about 0° and smaller than about 90°. The side portion WP reflects the light emitted from the light source part and traveling in a direction, for example, substantially in parallel to the lower surface of the display panel PNL to the display panel PNL.

The bottom chassis BC is disposed under the backlight unit BLU to accommodate the parts of the backlight unit. In this case, the bottom chassis BC may have a shape, for example, corresponding to that of the reflective sheet RS, and thus a side portion of the bottom chassis BC may be inclined with respect to the extension surface of the bottom portion BP of the reflective sheet RS. The bottom chassis BC may be formed of, for example, a metal having high strength and resistance to deformation. For example, in an exemplary embodiment, the bottom chassis BC may include at least one material selected from the group consisting of, for example, aluminum (Al), aluminum alloys, stainless steel, or steel electro galvanized cold-rolled coil (SECC).

The top chassis TC is disposed on, for example, the display panel PNL. The top chassis TC supports the front edge of the display panel PNL and covers a side surface of the mold frame MF or a side surface of the bottom chassis BC. The top chassis TC is provided with, for example, a display window WD formed therethrough to expose the display area DA of the display panel PNL. The top chassis TC may be formed of, for example, a metal having high strength and resistance to deformation. For example, in an exemplary embodiment, the top chassis TC may include at least one material selected from the group consisting of, for example, aluminum (Al), aluminum alloys, stainless steel, or steel electro galvanized cold-rolled coil (SECC).

Hereinafter, the light source part and the reflective sheet of the backlight unit will be described in detail.

FIG. 3 is a plan view showing a light source part and a reflective sheet of the display device shown in FIG. 1.

Referring to FIGS. 1 to 3, the light source part includes, for example, the light source blocks LB1 and LB2.

The light source blocks LB1 and LB2 includes, for example, a first light source block LB1 and a second light source block LB2. The first light source block LB1 includes, for example, the light sources LS arranged with different distances from those of the light sources LS included in the second light source block LB2. At least one of the first and second light source blocks LB1 and LB2 is provided in, for example, a plural number, and the first and second light source blocks LB1 and LB2 are alternately arranged with each other.

In the present exemplary embodiment, two first light source blocks LB1 and one second light source block LB2 will be described, but the number of the first and second light source blocks LB1 and LB2 according to exemplary embodiments of the present invention are not limited thereto or thereby. That is, the number of the first and second light source blocks LB1 and LB2 may be changed according to a size of the display panel PNL and a ratio of the long and short sides.

Each first light source block LB1 is extended in, for example, a direction in which the long sides are extended. Each first light source block LB1 includes, for example, the light sources LS arranged in the direction of the long sides with first distances and a first supporter SP1 that supports the light sources LS. For example, when a direction in which the short sides are extended is referred to as a first direction D1 and the direction, in which the long sides are extended, vertical to the first direction D1 is referred to as a second direction D2, the light sources LS are arranged in the second direction D2. In the present exemplary embodiment, each first light source block LB1 includes seven light sources LS, but the number of the light sources LS may be varied.

In the light sources LS of each first light source block LB1, the distances, e.g., first distances, between adjacent light sources LS to each other are, for example, different from each other. For instance, the first distances are decreased as the light sources LS are closer to both end portions in a longitudinal direction of the first light source blocks LB1 than to a center portion of the first light source blocks LB1. The light sources LS are arranged to be, for example, symmetrical with respect to the center portion in the longitudinal direction of the first light source blocks LB1. In FIG. 3, when the first distances between the adjacent light sources LS to each other are sequentially referred to as X11, X12, and X13 from the center portion, X11 is larger than X12 and X12 is larger than X13, e.g., X11>X12>X13. As an example, in a case that a diagonal length of the display area DA is about 32 inches, X11 is in a range from about 95 mm to about 98 mm, X12 is in a range from about 90 mm to about 94 mm, and X13 is in a range from about 85 mm to about 88 mm.

Here, the first distances between the light sources LS adjacent to each other may be reduced at a uniform ratio, but exemplary embodiments of the present invention are not limited thereto or thereby.

The second light source block LB2 includes, for example, the light sources LS arranged in the second direction with second distances and a second supporter SP2 that supports the light sources LS. The number of lights sources LS in the second light source blocks LB2 is equal to or different from the number of light sources LS in the first light source blocks LB1. In the present exemplary embodiment, the second light source block LB2 includes, for example, six light sources LS.

In the light sources LS of the second light source block LB2, the second distances between adjacent light sources LS to each other are, for example, different from each other. For instance, the second distances are increased as the light sources LS are closer to both end portions in a longitudinal direction of the second light source block LB2 than to a center portion of the second light source block LB2. The light sources LS are arranged, for example, to be symmetrical with respect to the center portion in the longitudinal direction of the second light source block LB2. For example, in FIG. 3, when the second distances between the adjacent light sources LS to each other are sequentially referred to as X21, X22, and X23 from the center portion, X21 is smaller than X22 and X22 is smaller than X23, i.e., X21<X22<X23. Here, the second distances between the light sources LS adjacent to each other may be increased at a uniform ratio, but exemplary embodiments of the present invention are not limited thereto or thereby. As an example, in a case that a diagonal length of the display area DA is about 32 inches, X21 is in a range from about 95 mm to about 98 mm, X22 is in a range from about 103 mm to about 106 mm, and X23 is in a range from about 111 mm to about 115 mm.

The first light source blocks LB1 and the second light source block LB2 are arranged to be, for example, substantially in parallel to each other along the first direction D1. The first light source blocks LB1 are arranged in, for example, odd-numbered rows along the first direction D1 and the second light source block LB2 is arranged in, for example, an even-numbered row. In other words, the first light source block LB1, the second light source block LB2, and the first light source block LB1 are sequentially arranged along the first direction. Accordingly, the first light source blocks LB1 are disposed at outermost rows, e.g., a first row and a last row.

When viewed in a side view, e.g., in the first direction vertical to the long sides, the light sources LS of the first light source blocks LB1 are, for example, alternately arranged with the light sources LS of the second light source blocks LB2 such that the light sources LS of the first light source blocks LB1 are not overlapped with the light sources LS of the second light source blocks LB2. Thus, a triangle defined by two adjacent light sources LS to each other of the first light source blocks LB1 and one light source LS of the second light source block LB2, which is most adjacent to the two adjacent light sources LS of the first light source blocks LB1, is formed by an acute angle. As a result, six light sources LS of the first and second light source blocks LB1 and LB2 are arranged in a honeycomb shape to surround one light source LS of the second light source block LB2. In addition, in a case that the number of the light sources LS of the first and second light source blocks LB1 and LB2 is increased, the light sources LS adjacent to each other may be arranged in the honeycomb shape to surround one light source of the first light source block LB1.

In this case, as the first distances are different from the second distances, the honeycomb shape defined by the light sources LS is not uniform, and thus an area of the honeycomb shape depends on the position of the light sources LS related to define the honeycomb shape.

For example, when the diagonal length of the display area DA is about 32 inches, the distance between the first light source block LB1 and the second light source block LB2 adjacent to the first light source block LB1 is in a range from about 110 mm to about 115 mm in the first direction D1.

The first and second light source blocks LB1 and LB2 of the light source part are disposed, for example, in the bottom portion BP of the reflective sheet RS. The side portion WP of the reflective sheet RS is, for example, inclined at the predetermined angle with respect to the extension surface of the bottom portion BP, and the inclination angle between the side portion WP and the extension surface of the bottom portion BP is, for example, larger than about 0° and smaller than about 90°. In the present exemplary embodiment, the side portion WP has the inclination angle from, for example, about 25° to about 35°. The inclination angle of a long side surface portion LSW may be different from, for example, the inclination angle of a short side surface portion SSW in accordance with the number and the positions of the light sources LS in each of the first and second light source blocks LB1 and LB2. For instance, when the diagonal length of the display area DA is about 32 inches, the inclination angle of the long side surface portion LSW is in a range from about 27° to about 32° and the inclination angle of the short side surface portion SSW is in a range from about 30° to about 36°.

The inclination angle of the long side surface portion LSW may be, for example, smaller than the inclination angle of the short side surface portion SSW. The inclination angle of the long side surface portion LSW and the short side surface portion SSW may be set to various values in accordance with the size of the display panel, the number of the first and second light source blocks LB1 and LB2, and the number of the light sources LS of the first and second light source blocks LB1 and LB2. As an example, when assuming that two display devices have the same size, the inclination angle of the long side surface portion LSW is relatively large as the number of the light sources LS of the display panel is relatively small.

The long side surface portion LSW has, for example, a width W1 different from a width W2 of the short side surface portion SSW in accordance with a difference between the inclination angle of the long side surface portion LSW and the inclination angle of the short side surface portion SSW. For instance, the width W1 in the first direction D1 of the long side surface portion LSW may be greater than the width W2 in the second direction D2 of the short side surface portion SSW.

Among the light sources, a light source (e.g., the light source LS of the first light source block LB1), which is most adjacent to a corner of the display panel, is disposed at an imaginary line extended from a line at which the long side surface portion LSW meets the short side surface portion SSW when viewed in a plan view. In a case that the light source LS is strayed from the imaginary line extended, the reflection by any one of the long side surface portion LSW and the short side surface portion SSW is intensified.

In an exemplary embodiment, when a distance between a vertex of the display area DA and the light source most adjacent to the corner is too far, a dark spot appears at the side portion as the light is not supplied enough to the side portion. On the contrary, when the distance between the vertex of the display area DA and the light source LS most adjacent to the corner is too close, a bright spot appears at the side portion. Accordingly, in the present exemplary embodiment, the light source LS is located at, for example, a position spaced apart from the long side surface portion LSW and the short side surface portion SSW by a predetermined distance. For example, when the diagonal length of the display area DA is about 32 inches, a shortest distance between the long side surface portion. LSW and the light source LS most adjacent to the vertex of the display area DA is in a range from about 31 mm to about 33 mm and a shortest distance between the short side surface portion SSW and the light source LS most adjacent to the vertex of the display area DA is in a range from about 30 mm to about 32 mm. In addition, for example, a shortest distance between the corner of the long side surface portion LSW and the light source LS most adjacent to the vertex of the display area DA is in a range from about 84 mm to about 87 mm and a shortest distance between the corner of the short side surface portion SSW and the light source LS most adjacent to the vertex of the display area DA is in a range from about 74 mm to about 76 mm or from about 84 mm to 86 mm.

According to the present exemplary embodiment, the first distances of the light sources LS of the first light source blocks LB1 disposed at outermost positions are reduced as the light sources LS are spaced further away from the center portion of each first light source block LB1, and thus the amount of the light supplied to the side portion WP of the reflective sheet RS is increased. Therefore, although the light sources LS are not disposed on the side portion WP of the reflective sheet RS, the amount of the light supplied to the display panel PNL is controlled by using the side portion WP that reflects the light emitted from the light sources LS, thereby increasing the brightness of the display area DA. In addition, the amount of the light is reduced as it is closer to the center portion of the first light source blocks LB1 according to the first distances, but the second distances between the light sources LS of the second light source block LB2 is reduced as the light sources LS of the second light source block LB2 are closer to the center portion of the second light source block LB2. Thus, the light emitted from the light sources LS of the second light source block LB2 compensated for the non-uniform light density caused by the light sources LS of the first light source block LB1. Consequently, as the first distances are different from the second distances with respect to the center portion of the first and second light source blocks LB1 and LB2, the uniformity of the light supplied to the display panel PNL may be increased.

In an exemplary embodiment, the light sources LS are individually and independently driven to realize the local dimming.

As shown, a distance P1 represents a shortest distance between the edge of the long side surface portion LSW and a center of each light source LS most adjacent to the vertex of the display area DA of the first block LB1. A distance P2 represents a shortest distance between the edge of the short side surface portion SSW and a center of each light source LS most adjacent to the vertex of the display area DA of the first block LB1.

A distance Q1 may represent a sum of the distance P1 and the width W1 of the long side surface portion LSW. A distance Q2 may represent a sum of the distance P2 and the width W2 of the short side surface portion SSW.

Figure 4A:
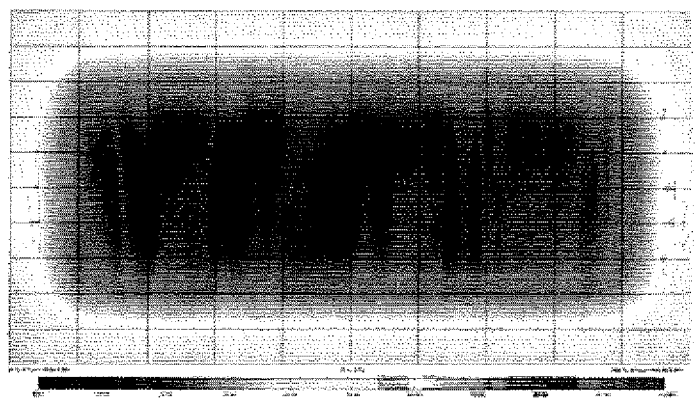
FIGS. 4A to 4C are simulation graphs showing brightness of a conventional display device and brightness of a display device according to an exemplary embodiment of the present invention.
Figure 4B:
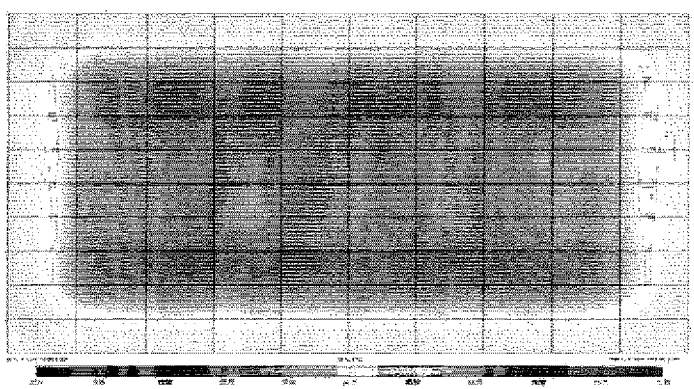
Figure 4C:
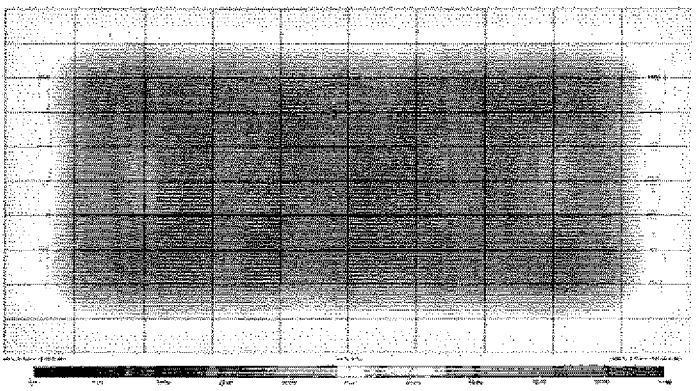

FIGS. 4A to 4C are simulation graphs showing brightness of a conventional display device and brightness of a display device according to an exemplary embodiment of the present invention. In the simulation graphs shown in FIGS. 4A to 4C, all conditions are the same for the simulation except for the arrangement of the light sources. That is, FIG. 4A shows the simulation result of the light sources arranged in a lattice form in which the light sources are arranged at equidistant intervals along the first and second direction. FIG. 4B shows the simulation result of the light sources arranged at the equidistant intervals, but alternately arranged with each other to form the honeycomb shapes. The honeycomb shapes in FIG. 4B have the same size. FIG. 4C shows the simulation result of the light sources arranged in the second direction with different distances. In FIG. 4C, the light sources form the honeycomb shapes, but a portion of the honeycomb shape has different size and shape. As shown in FIG. 4A, when the light sources are arranged in the lattice form, a difference between the brightness of the display area corresponding to the bottom portion of the reflective sheet and the brightness of the display area corresponding to the side portion of the reflective sheet is large. In addition, in the display area corresponding to the bottom portion of the reflective sheet, the brightness difference between the area in which the light sources are disposed and the area in which the light sources are not disposed is large as the viewer perceives the brightness difference between the areas. As shown in FIG. 4B, when the light sources are arranged in the honeycomb shape, the brightness difference between the display area corresponding to the bottom portion of the reflective sheet and the display area corresponding to the side portion of the reflective sheet is smaller than that when the light sources are arranged in the lattice form. However, in the display area corresponding to the bottom portion of the reflective sheet, the brightness difference between the area in which the light sources are disposed and the area in which the light sources are not disposed is large as the viewer perceives the brightness difference between the areas. As shown in FIG. 4C, the brightness difference between the display area corresponding to the bottom portion of the reflective sheet and the display area corresponding to the side portion of the reflective sheet becomes smaller than those when the light sources are arranged in the lattice form and when the light sources are arranged in the honeycomb shape with the equidistant intervals. In addition, the arrangement of the light sources is not perceived by the viewer, and the brightness is uniform in the entire area.

Figure 5A:
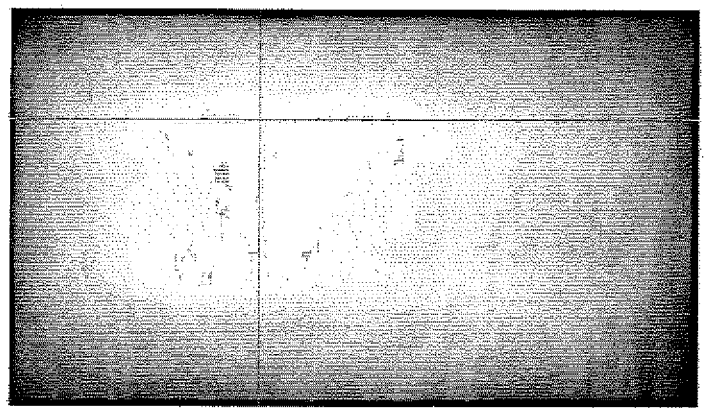
FIGS. 5A and 5B are photographs showing appearance of a backlight unit of a conventional display device and appearance of a backlight unit of a display device according to an exemplary embodiment of the present invention.
Figure 5B:
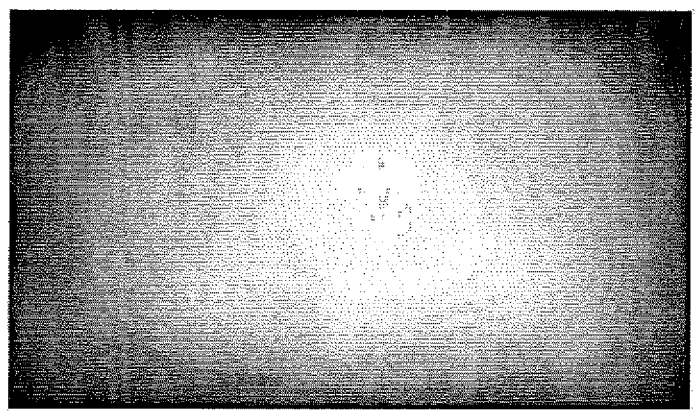

FIGS. 5A and 5B are photographs showing appearance of a backlight unit of a conventional display device and appearance of a backlight unit of a display device according to an exemplary embodiment of the present disclosure. In FIGS. 5A and 5B, all conditions are the same for the simulation except for the arrangement of the light sources. FIG. 5A shows the appearance of the backlight unit in which the light sources are arranged in the lattice form, and FIG. 5B shows the appearance of the backlight unit in which the light sources are arranged in the second direction with the different distances according to the present exemplary embodiment.

As shown in FIGS. 5A and 5B, the brightness difference between the center portion and the end portion of the backlight unit is large in the conventional display device. In addition, the dark portion and the bright portion are perceived in the center portion in accordance with the positions of the light sources. In comparison, the brightness of the display area of the backlight unit of the display device according to the present exemplary embodiment is uniform.

Figure 6:
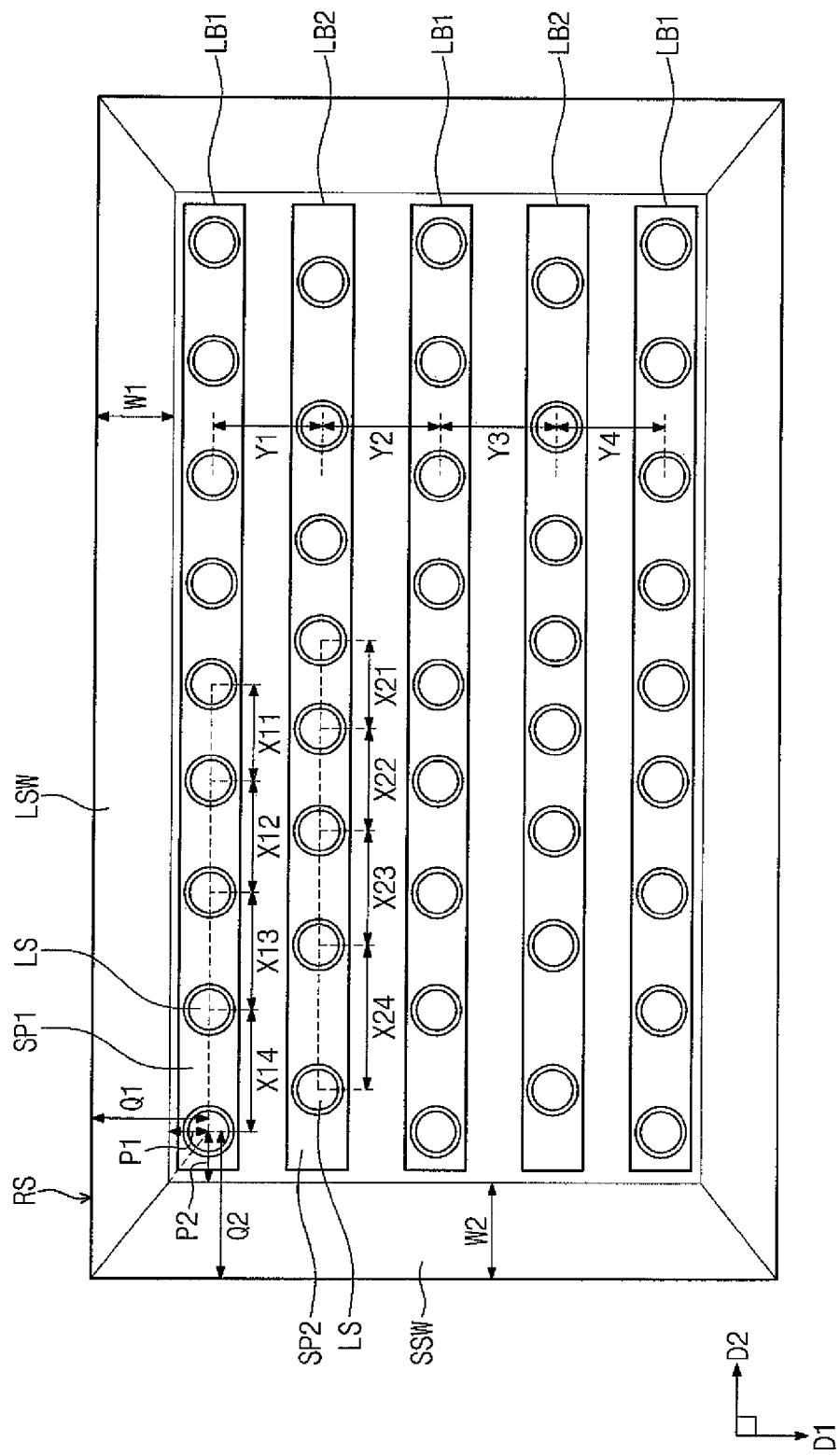
FIG. 6 is a plan view showing a light source part and a reflective sheet according to an exemplary embodiment of the present invention.

FIG. 6 is a plan view showing a light source part and a reflective sheet according to an exemplary embodiment of the present invention.

Referring to FIGS. 1, 2, and 6, the light source blocks includes, for example, a first light source block LB1 and a second light source block LB2. The first light source block LB1 includes, for example, the light sources LS arranged with different distances from those of the light sources LS included in the second light source block LB2. Each of the first and second light source blocks LB1 and LB2 is provided, for example, in a plural number, and the first and second light source blocks LB1 and LB2 are alternately arranged with each other. In the present exemplary embodiment, three first light source blocks LB1 and two second light source blocks LB2 will be described, but the number of the first and second light source blocks. LB1 and LB2 according to exemplary embodiments of the present invention are not limited thereto or thereby. That is, the number of the first and second light source blocks LB1 and LB2 may be changed according to the size of the display panel PNL and the ratio of the long and short sides.

Each of the first and second light source blocks LB1 and LB2 includes, for example, a plurality of light sources. Each first light source block LB1 is extended, for example, in a direction in which the long sides are extended. Each first light source block LB1 includes, for example, the light sources LS arranged in the direction of the long sides with first distances and a first supporter SP1 that supports the light sources LS. In the present exemplary embodiment, each first light source block LB1 includes nine light sources LS, but the number of the light sources LS may be varied.

In the light sources LS of each first light source block LB1, the first distances are, for example, different from each other. For instance, the first distances are increased as the light sources LS are closer to both end portions in a longitudinal direction of the first light source blocks LB1 than to a center portion of the first light source blocks LB1. For example, in FIG. 6, when the first distances between the adjacent light sources LS to each other are sequentially referred to as X11, X12, X13, and X14 from the center portion, X11 is smaller than X12, X12 is larger than X13, and X13 is smaller than X14, e.g., X11<X12<X13<X14. As an example, in a case that a diagonal length of the display area DA is about 40 inches, X11 is in a range from about 79 mm to about 81 mm, X12 is in a range from about 95 mm to about 97 mm, X13 is in a range from about 97 mm to about 99 mm, and X14 is in a range from about 101 mm to about 103 mm. The first distances between the light sources LS adjacent to each other may be increased at a uniform ratio, but exemplary embodiments of the present invention are not limited thereto or thereby.

Each second light source block LB2 includes, for example, the light sources LS arranged in the second direction with the second distances and a second supporter SP2 that supports the light sources LS. The number of the light sources LS of the second light source blocks is equal to or different from the number of the light sources LS of the first light source blocks LB1. In the present exemplary embodiment, each second light source block LB includes, for example, eight light sources LS.

In the light sources LS of each second light source block LB2, the second distances between adjacent light sources LS to each other are, for example, different from each other. For instance, the second distances are increased as the light sources LS are closer to both end portions in a longitudinal direction of the second light source block LB2 than to a center portion of the second light source block LB2. For example, in FIG. 6, when the second distances between the adjacent light sources LS to each other are sequentially referred to as X21, X22, X23, and X24 from the center portion, X21 is smaller than X22, X22 is smaller than X23, and X23 is smaller than X24, e.g., X21<X22<X23<X24. Here, the second distances between the light sources LS adjacent to each other may be increased at a uniform ratio, but exemplary embodiments of the present invention are not limited thereto or thereby. As an example, in the case that the diagonal length of the display area DA is about 40 inches, X21 is in a range from about 97 mm to about 99 mm, X22 is in a range from about 100 mm to about 102 mm, X23 is in a range from about 103 mm to about 105 mm, and X24 is in a range from about 107 mm to about 109 mm.

The first light source blocks LB1 and the second light source blocks LB2 are arranged to be, for example, substantially in parallel to each other along the second direction D1. The first light source blocks LB1 are, for example, alternately arranged with the second light source blocks LB2.

For example, when viewed in a side view, e.g., in the first direction vertical to the long sides, the light sources LS of the first light source blocks LB1 are alternately arranged with the light sources LS of the second light source blocks LB2 such that the light sources LS of the first light source blocks LB1 are not overlapped with the light sources LS of the second light source blocks LB2. Thus, a triangle defined by two adjacent light sources LS to each other of the first light source blocks LB1 and one light source LS of the second light source block LB2, which is most adjacent to the two adjacent light sources LS of the first light source blocks LB1, is formed by an acute angle. For example, as a result, six light sources LS of the first and second light source blocks LB1 and LB2 are arranged in a honeycomb shape to surround the one light source LS of the second light source block LB2. In addition, the light sources LS of the first and second light source blocks LB1 and LB2 may be arranged, for example, in the honeycomb shape to surround one light source of the first light source block LB1. In this case, as the first distances are different from the second distances, the honeycomb shape defined by the light sources LS is not uniform, and thus an area of the honeycomb shape depends on the position of the light sources LS related to define the honeycomb shape.

Further, distances between the first and second light source blocks LB1 and LB2, which are adjacent to each other, are not uniform in the first direction D1. For example, in FIG. 6, when the distances between the adjacent first and second light source blocks LB1 and LB2 are sequentially referred to as Y1, Y2, Y3, and Y4, Y1, Y2, Y3, and Y4 have different values. In an embodiment of the present invention, the distances in the first direction between the first light source block and the second light source block adjacent to the first light source block become larger as the first light source block and the second light source block are closer to a center of the display area. For example, Y1 has the same value as Y4, Y2 has the same value as Y3, and Y2 is smaller than Y1. As an example, in the case that the diagonal length of the display area DA is about 40 inches, Y1 is in a range from about 98 mm to about 102 mm and Y2 is in a range from about 84 mm to about 88 mm.

The reflective sheet RS includes, for example, a bottom portion BP on which the light source part is mounted and a side portion WP surrounding the bottom portion BR The side portion WP of the reflective sheet RS is, for example, inclined at the predetermined angle with respect to the extension surface of the bottom portion BP, and the inclination angle between the side portion WP and the extension surface of the bottom portion BP is, for example, larger than about 0° and smaller than about 90°. In the present exemplary embodiment, the side portion WP has the inclination angle from, for example, about 25° to about 35°. When the diagonal length of the display area DA is about 40 inches, the inclination angle of the long side surface portion LSW is in a range, for example, from about 27° to about 29° and the inclination angle of the short side surface portion SSW is in a range, for example, from about 30° to about 32°.

For example, in an exemplary embodiment, when the diagonal length of the display area DA is about 40 inches, a shortest distance between the long side surface portion LSW and the light source most adjacent to the vertex of the display area DA is in a range from about 18 mm to about 20 mm and a shortest distance between the short side surface portion SSW and the light source LS most adjacent to the vertex of the display area DA is in a range from about 30 mm to about 32 mm. In addition, for example, a shortest distance between the corner of the long side surface portion LSW and the light source LS most adjacent to the vertex of the display area DA is in a range from about 60 mm to about 62 mm and a shortest distance between the corner of the short side surface portion SSW and the light source LS most adjacent to the vertex of the display area DA is in a range from about 68 mm to about 70 mm or from about 82 mm to 85 mm.

According to the present exemplary embodiment, the first distances of the light sources LS of the first light source blocks LB1 disposed at outermost positions are increased as the light sources LS are spaced further away from the center portion of each first light source block LB1. Nevertheless, as the inclination angle of the side portion WP of the reflective sheet RS is large and the distance between the side portion WP and the light sources LS is small, the amount of the light supplied to and reflected by the side portion WP of the reflective sheet RS is increased. Therefore, the distances between the light sources LS may be narrowed to increase the amount of the light in the center portion of each light source block. Therefore, the light density becomes uniform in the display area DA corresponding to the bottom portion BP and the side portion WP. In addition, as the first distances are different from the second distances with respect to the center portion of the first and second light source blocks LB1 and LB2, the uniformity of the light supplied to the display panel PNL may be increased.

Having described exemplary embodiments of the invention, it is further noted that it is readily apparent to those of ordinary skill in the art that various modifications may be made without departing from the spirit and scope of the invention which is defined by the metes and bounds of the appended claims.

What is claimed is:

1. A display device comprising:
a display panel including a display area;
a plurality of light source blocks disposed under the display area in a first direction, the light source blocks comprising:
a first light source block including a plurality of light sources disposed in a second direction vertical to the first direction with first distances between the plurality of light sources of the first light source block, wherein all of the light sources of the first light source block are disposed in a single line and on a single contiguous substrate;
a second light source block including a plurality of light sources disposed in the second. direction with second distances between the plurality of light sources of the second light source block, wherein all of the light sources of the second light source block are disposed in a single line; and
a reflective sheet disposed under the first and second light source blocks,
wherein the first distances decrease, at least twice, as the light sources of the first light source block are closer to an end portion of the first light source block than to a center portion of the first light source block,
wherein the second distances gradually increase as the light sources of the second light source block are closer to an end portion of the second light source block than to a center portion of the second light source block,
wherein a distance between two light sources of the center portion of the second light source block is a minimum distance among the second distances,
wherein the plurality of the light source blocks comprises an alternating pattern of the first light source block and the second light source block across an entirety of the display area, and
wherein each of the light sources of the first light source block and each of the light sources of the second light source block adjacent to the first source block are alternately arranged along the second direction.

2. The display device of claim 1, wherein a number of the first light source blocks is more than a number of the second light source blocks by one, and the first light source blocks are disposed in odd-numbered rows while the second light source blocks are disposed in even-numbered rows.

3. The display device of claim 1, wherein the light sources of the first light source block are not overlapped with the light sources of the second light source block adjacent to the first light source block when viewed in the first direction.

4. The display device of claim 1, wherein a decrease ratio of the first distances and an increase ratio of the second distances are not the same.

5. The display device of claim 1, wherein the distance in the first direction between one of the first light source blocks and one of the second light source blocks adjacent to the one first light source block is larger than the distance in the first direction between another of the first light source blocks and another of the second light source blocks adjacent to the another first light source block, wherein, the another first light source block and the another second light source block are closer to a center of the display area than the first light source block and the second light source block, respectively.

6. The display device of claim 1, wherein a side portion of the reflective sheet comprises a long side surface portion corresponding to the long sides of the display area and a short side surface portion corresponding to the short sides of the display area, and wherein the long side surface portion has a width in the first direction, which is greater than a width of the short side surface portion in the second direction.

7. The display device of claim 1, wherein the first and second light source blocks are disposed on a bottom portion of the reflective sheet.

8. The display device of claim 7, wherein a side portion of the reflective sheet comprises a long side surface portion corresponding to the long sides of the display area and a short side surface portion corresponding to the short sides of the display area, and wherein the light source of the first light source block most adjacent to a vertex of the display area among the light sources is disposed on an imaginary line extended from a line at which the long side surface portion meets the short side surface portion when viewed in a plan view.

9. The display device of claim 1, further comprising a diffusion sheet disposed between the display panel and the first and second light source blocks, wherein the diffusion sheet is configured to diffuse alight provided from the plurality of light source blocks.

10. The display device of claim 1, wherein the light sources of the first and second light source blocks are configured to be individually and independently driven.

11. The display device of claim 1, wherein the reflective sheet comprises a bottom portion substantially parallel to a surface of the display panel and a side portion bent upward from the bottom portion.

12. The display device of claim 11, wherein the display area has a rectangular shape with a. pair of long sides and a pair of short sides, wherein the side portion of the reflective sheet comprises long side surface portions corresponding to, and aligned with, the long sides of the display area and short side surface portions corresponding to, and aligned with, the short sides of the display area, and each of the long side surface portions has a first inclination angle and each of the short side surface portions has a second inclination angle that is larger than the first inclination angle.

13. The display device of claim 12, wherein the first inclination angle is in a range from about 27° to about 32° and the second inclination angle is in a range from about 30° to about 36°.

14. The display device of claim 13, wherein the first inclination angle is in a range from about 27° to about 29° and the second inclination angle is in a range from about 30° to about 32° when the display area has a diagonal length of about 32 inches.

15. The display device of claim 14, wherein a shortest distance between either of the long side surface portions and the light source most adjacent to a vertex of the display area is in a range from about 31 mm to about 33 mm and a shortest distance between either of the short side surface portions and the light source most adjacent to the vertex of the display area is in a range from about 30 mm to about 32 mm.

16. The display device of claim 13, wherein the first inclination angle is in a range from about 30° to about 32° and the second inclination angle is in a range from about 34° to about 36° when the display area has a diagonal length of about 40 inches.

17. The display device of claim 16, wherein a shortest distance between either of the long side surface portions and the light source most adjacent to a vertex of the display area is in a range from about 18 mm to about 20 mm and a shortest distance between either of the short side surface portions and the light source most adjacent to the vertex of the display area is in a range from about 30 mm to about 32 mm.

18. A backlight unit comprising:
a light source part configured to emit a light; and
a reflective sheet disposed under the light source part, the light source part comprising:
a first light source block including a plurality of light sources disposed in a predetermined direction with first distances between the plurality of light sources of the first light source block, wherein all of the light sources of the first light source block are disposed in a single line and on a single contiguous substrate; and
a second light source block including a plurality of light sources disposed in the predetermined direction with second distances between the plurality of light sources of the second light source block, wherein all of the light sources of the second light source block are disposed in a single line,
wherein the first distances decrease, at least twice, as the light sources of the first light source block are closer to an end portion of the first light source block than to a center portion of the first light source block,
wherein the second distances gradually increase as the light sources of the second light source block are closer to an end portion of the second light source block than to a center portion of the second light source block,
wherein a distance between two light sources of the center portion of the second light source block is a minimum distance among the second distances,
wherein the plurality of the light source blocks comprises an alternating pattern of the first light source block and the second light source block across an entirety of the display area, and
wherein each of the light sources of the first light source block and each of the light sources of the second light source block adjacent to the first light source block are alternately arranged along the second direction.

* * * * *